(12) United States Patent
Huang et al.

(10) Patent No.: US 9,664,227 B2
(45) Date of Patent: May 30, 2017

(54) VACUUM RETAINING DEVICE CAPABLE OF REUSE

(71) Applicants: Jin-Shu Huang, Taichung (TW);
Jin-Dian Huang, Taichung (TW);
Chin-Chun Huang, Taichung (TW);
Chinhung Huang, Taichung (TW);
Lien-Yung Huang, Taichung (TW)

(72) Inventors: Jin-Shu Huang, Taichung (TW);
Jin-Dian Huang, Taichung (TW);
Chin-Chun Huang, Taichung (TW);
Chinhung Huang, Taichung (TW);
Lien-Yung Huang, Taichung (TW)

(73) Assignee: Canshow Industrial Co., Ltd., Taichung (TW)

( * ) Notice: Subject to any disclaimer, the term of this patent is extended or adjusted under 35 U.S.C. 154(b) by 0 days.

(21) Appl. No.: 15/089,596

(22) Filed: Apr. 4, 2016

(65) Prior Publication Data

US 2016/0215813 A1    Jul. 28, 2016

(51) Int. Cl.
*F16B 47/00* (2006.01)
*F16M 13/02* (2006.01)
*F16B 45/00* (2006.01)

(52) U.S. Cl.
CPC ............ *F16B 47/006* (2013.01); *F16B 47/00* (2013.01); *F16M 13/022* (2013.01); *F16B 45/00* (2013.01)

(58) Field of Classification Search
USPC ...................................................... 248/205.8
See application file for complete search history.

(56) References Cited

U.S. PATENT DOCUMENTS

| 4,580,751 | A  | * | 4/1986  | Panzer  | E03C 1/06 248/205.8 |
| 4,813,640 | A  | * | 3/1989  | Perentin | F16B 47/00 248/205.8 |
| 6,550,735 | B1 | * | 4/2003  | Zheng   | F16B 47/00 248/205.5 |
| 6,663,077 | B2 | * | 12/2003 | Zou     | F16B 47/00 248/205.5 |
| 6,932,306 | B2 | * | 8/2005  | Zou     | F16B 47/00 248/205.5 |
| 7,293,750 | B2 | * | 11/2007 | Richter | F16B 47/00 248/205.5 |
| 7,455,269 | B1 | * | 11/2008 | Chien   | F16B 47/006 248/205.8 |
| 7,503,540 | B2 | * | 3/2009  | Hood    | F16B 47/00 248/205.8 |

(Continued)

*Primary Examiner* — Monica Millner

(57) ABSTRACT

A vacuum retaining device capable of reuse includes a sucking disk member. The periphery of a disk surface portion of the sucking disk member is formed with a coupling edge portion wrapped and connected with a sealing rim. During use, the coupling edge portion inside the sealing rim forms a support, such that the shape and efficiency of the sealing rim can be kept for a long time. When a sealing surface of the sealing rim is poked to disengage from a surface to be adhered, the sealing surface is able to link the coupling edge portion of the sucking disk body. When the vacuum retaining device is not used, the outer edge of the sealing rim is poked for the air to enter the interior of the sucking disk body. The vacuum retaining device can be detached from the surface easily and conveniently.

7 Claims, 6 Drawing Sheets

(56) References Cited

U.S. PATENT DOCUMENTS

| | | | | |
|---|---|---|---|---|
| 7,878,467 B2* | 2/2011 | Chen | ...................... | F16B 47/00 |
| | | | | 248/205.7 |
| 7,992,908 B2* | 8/2011 | Finck | ...................... | F16B 47/00 |
| | | | | 248/205.8 |
| 8,104,809 B1* | 1/2012 | Mayhugh | .............. | B25B 11/007 |
| | | | | 248/205.8 |
| 8,356,781 B2* | 1/2013 | Chen | ...................... | F16B 47/006 |
| | | | | 248/205.7 |
| 8,887,357 B2* | 11/2014 | Jimenez | .................. | B62J 27/00 |
| | | | | 16/421 |
| 8,979,046 B2* | 3/2015 | Woo | ........................ | F16B 47/00 |
| | | | | 248/205.5 |
| 9,057,398 B2* | 6/2015 | Yang | ...................... | F16B 47/006 |
| 9,145,913 B2* | 9/2015 | Song | ...................... | A42B 3/006 |
| 9,200,667 B1* | 12/2015 | Hsu | ........................ | F16M 13/02 |
| 9,410,571 B2* | 8/2016 | Yang | ...................... | F16B 47/00 |
| 2002/0175527 A1* | 11/2002 | Huang | .................... | F16B 47/00 |
| | | | | 294/187 |
| 2007/0120026 A1* | 5/2007 | Chen | ...................... | F16B 47/00 |
| | | | | 248/205.5 |
| 2007/0278369 A1* | 12/2007 | Yu | .......................... | F16B 47/00 |
| | | | | 248/205.8 |
| 2008/0230662 A1* | 9/2008 | Takahashi | ............. | F16B 47/006 |
| | | | | 248/206.2 |
| 2011/0127395 A1* | 6/2011 | Ostendarp | ............ | F16B 47/006 |
| | | | | 248/205.8 |

\* cited by examiner

VACUUM RETAINING DEVICE CAPABLE OF REUSE

BACKGROUND OF THE INVENTION

1. Field of the Invention

The present invention relates to a vacuum retaining device, and more particularly to a vacuum retaining device capable of reuse. The vacuum retaining device can keep the shape and efficiency of a sealing rim for a long time. When it is detached from a surface to be adhered, the vacuum retaining device can be operated conveniently.

2. Description of the Prior Art

In general, it is more difficult to use a screw or a nail on a wall adhered with tiles or a glass surface for hanging or retaining some articles. A vacuum retaining device is widely used on the market, which is manufactured according to the principle of a sucking disc as the legs of an octopus. This vacuum retaining device has a sucking disk similar to a saucer disposed upside down. The sucking disc is placed on a smooth surface (such as a glass surface or a tile surface). After the air inside the sucking disk is discharged, the interior volume of the sucking disk is forced to increase. The external pressure (i.e., atmospheric pressure) will be greater than the interior pressure of the sucking disk. Thus, the sucking disk is pressured by the atmospheric pressure, so that the vacuum retaining device can be adhered to the smooth surface.

Japanese Utility Model Publication No. So61-109367 (published on Jul. 11, 1986) discloses a vacuum retaining device. After a period of time, the sucking disc of this vacuum retaining device will be hardened to seriously affect its suction force. In particular, when the surface to be adhered has a slit or a serrate line, the sucking disk cannot form a complete vacuum wall so it is no longer able to adhere to the surface.

In order to solve the aforesaid problems of the prior art, an improved vacuum retaining device is developed, as disclosed in Japanese Utility Model Reg. No. 3014841 (granted on Jun. 7, 1995). This vacuum retaining device has a screw rod shaft installed at the upper portion of the center of the sucking disc, an arc press plate for the screw rod shaft to be inserted therein and covering the upper surface of the sucking disc, and a handle connected with the screw rod shaft extending out from the upper portion of the press plate. The edge of the sucking surface of the sucking disk is provided with adhesive which is a binding material having ductility (such as adhesive silicone).

It is a good attempt to use the binding material having ductility to enhance the adhesion of the sucking disk. However, the sucking disk is made of a soft material. When the center of the sucking disk is lifted toward the press plate to enlarge the interior volume of the sucking disk, the edge of the sucking disk may be deformed or it may result in a slight slide between the sucking surface and the surface to be adhered. Specially, if there is a serrate line on the surface to be adhered, the existing technique is unable to provide a perfect binding force.

Chinese Patent No. ZL200480029868.9 also discloses a vacuum retaining device. This vacuum retaining device includes a gel-type vacuum wall made of polyurethane. The vacuum wall extends outward from the bottom of a press plate to the edge of the press plate toward a surface to be adhered. The vacuum retaining device further has a press surface inclined toward the center of the press plate to join an upward slope of a sucking disk. When the press plate makes the interior of the sucking disk be a vacuum state, the slit or the serrate portion of the surface to be adhered can be blocked by the gel-type vacuum wall, so that the interior of the sucking disk is kept in a vacuum state. However, the vacuum retaining device fixed to the surface to be adhered is not limited to a long time. It may be fixed temporarily or changed to a different surface for reuse. When the foresaid vacuum retaining device is detached from the surface, it is necessary to use a screw rod fastening member to restore the interior volume of the enlarged sucking disk for the external air to enter the interior of the sucking disk, such that the vacuum retaining device can be detached from the surface. Although the gel-type vacuum wall made of polyurethane provides better adhesion and elongation to block the external air, it cannot be restored well after elongation and may have a deformation to affect the sealing effect when it is detached from the surface to be adhered repeatedly. A portion of the inclined press surface may disengage from the upward slope of the sucking disk. As a result, the air enters the interior of the sucking disk. Sometimes, a portion of the vacuum wall has been detached from the surface to be adhered, and the sucking disk located at the inner edge of the vacuum wall still adheres to the surface to be adhered. It is not easy to poke the edge of the sucking disk away from the surface to be adhered. For this reason, the vacuum retaining device cannot be fixed repeatedly and conveniently. Accordingly, the inventors of the present invention have devoted themselves based on their many years of practical experiences to solve these problems.

SUMMARY OF THE INVENTION

The primary object of the present invention is to provide a vacuum retaining device capable of reuse. The vacuum retaining device comprises a pull member, a sucking disk member, a press member, and a fastening operation member.

The pull member is made of a hard rigid plastic material. The pull member has a pull rod. One end of the pull rod is formed with a pull plate.

The sucking disk member comprises a sucking disk body and a sealing rim. The sucking disk body is made of a flexible elastic macromolecule material and integrally formed with the pull plate of the pull member by injection molding when the pull member is placed in a plastic mold. The sucking disk body is a soft disk-shaped elastic body, and has a covering portion to cover the pull plate. A lower edge of the covering portion is enlarged and formed with a disk surface portion. An outer periphery of the disk surface portion is formed with a coupling edge portion. A bottom of the disk surface portion is formed with a suction surface portion. The sealing rim is made of a TPS (Thermoplastic Styrene Elastomer) plastic material and integrally formed with the coupling edge portion of the sucking disk body by over-molding in a plastic mold. The sealing rim is a soft elastic rim with high elongation rate, and has a hardness of Shore C 20-30 degrees. The sealing rim has an upper rim portion, a side rim portion, and a bottom rim portion to cover and connect with the coupling edge portion. An upper surface of the upper rim portion is formed with a compression surface. A lower surface of the bottom rim portion is formed with a sealing surface located next to the suction surface portion of the sucking disk body.

The press member is a high-strength cup made of a hard resign material. A bottom of the press member has a press surface portion corresponding to the compression surface of the sealing rim for the compression surface to lean against the upper rim portion. The press surface portion has an accommodation room therein to accommodate the sucking disk body. The press member has a through hole above the accommodation room for the pull rod of the pull member to pass therethrough. A space is formed between the through hole and the covering portion of the sucking disk body.

The fastening operation member leans against an upper end of the press member and is connected with the pull rod of the pull member out of the through hole. The fastening operation member can be operated on the press member to bring the pull rod to extend out of the through hole.

When the fastening operation member with the press member is pressed down toward a surface to be adhered, the suction surface portion of the sucking disk body of the sucking disk member and the sealing surface of the sealing rim are attached to the surface to block the exterior air from entering the interior of the sucking disk body. By operating the fastening operation member, the pull rod of the pull member is moved upward toward the through hole. When the covering portion of the sucking disk body is lifted by the pull rod, the disk surface portion is enlarged and deformed to form a vacuum suction between the sucking disk body and the surface. The counterforce of the elasticity of the disk surface portion after enlarged and deformed applies a down force to the press member through the pull rod to act on the fastening operation member and enables the press surface portion of the press member to press the upper rim portion of the sealing rim. The sealing surface is in contact with the surface tightly. Even if the surface has a slit or a serrate line, the seam or the serrate line can be blocked by the compressed bottom rim portion. Thus, the sucking disk body can be retained on the surface well in a vacuum suction state. The periphery of the disk surface portion of the sucking disk body is formed with the coupling edge portion to cover and connect with the sealing rim. The vacuum retaining device can be reused at different positions of the surface or a different surface to be adhered. During use, the coupling edge portion inside soft the sealing rim is deformed as a support, such that the efficacy of the sealing rim can be kept for a long time. In particular, when the sealing surface of the sealing rim is poked by an external force to disengage from the surface, the sealing surface is able to link the coupling edge portion of the sucking disk body. When the vacuum retaining device is not used, the outer edge of the side rim portion of the sealing rim is poked for the air to enter the interior of the sucking disk body to form a vacuum state. The vacuum retaining device can be detached from the surface easily and conveniently.

Preferably, the coupling edge portion at the outer periphery of the disk surface portion of the sucking disk body of the sucking disk member has a reverse L shape. The sealing rim is to cover and connect with the coupling edge portion. The sealing rim has a buckle portion to buckle a rear edge end surface of the coupling edge portion, such that the sealing rim can cover and retain the coupling edge portion of the sucking disk body stably and firmly and won't disengage from the disk surface portion of the sucking disk body.

Preferably, the sucking disk body of the sucking disk member is made of a TPE (Thermoplastic elastomer) material by injection molding. The covering portion, the disk surface portion and the coupling edge portion have a hardness of Shore A 70-90 degrees. The sealing rim is integrally formed with the coupling edge portion by over-molding. During forming, because the material of the sealing rim is TPE, the sealing rim can be bound with a portion of the disk surface portion and the whole coupling edge portion. The sealing rim covers the coupling edge portion fully and is connected with the coupling edge portion. They won't disengage from each other.

Preferably, the lower surface of the bottom rim portion of the sealing rim is provided with at least one protrusion extending outward from the sealing surface. Through the protrusion, the surface can be pressed more tightly by the bottom rim portion to enhance the seal capability of the sealing rim. Through the elastic resilience of the protrusion after pressed and deformed, the convenience for the sealing surface to disengage from the surface can be enhanced.

Preferably, the coupling edge portion at the outer periphery of the disk surface portion of the sucking disk body of the sucking disk member is provided with a pull piece passing the upper rim portion of the sealing rim and extending outward. When the pull piece is pulled, a portion of the sealing surface and a portion of the sucking disk body are brought to disengage from the surface, such that the vacuum retaining device can be detached from the surface easily.

Preferably, one end of the pull rod of the pull member extends out of the through hole of the press member. The pull rod has an outer threaded portion disposed out of the through hole. The fastening operation member is a knob. One end of the fastening operation member is in contact with the upper end of the press member and has an inner threaded hole to mesh with the outer threaded portion. By turning the tightening operation member, the inner threaded hole acts on the immovable outer threaded portion to drive the pull rod to displace toward the inner threaded hole. Through the pull rod, the covering portion of the sucking disk body is lifted and the disk surface portion is enlarged and deformed to apply a down force to the press member.

Preferably, the covering portion of the sucking disk body is lifted, enabling the disk surface portion to be a vacuum state. The end of the pull rod of the pull member, extending out of the through hole of the press member, has a pivot hole. The tightening operation member is shaped like a handle and has an eccentric cam portion which is pivotally connected with the pivot hole and in contact with the upper end of the press member. The eccentric cam portion is turned to actuate and bring the pull rod to extend out of the through hole of the press member. When the tightening operation member is pulled to turn, the pull rod is to lift the covering portion of the sucking disk body and the disk surface portion is enlarged and deformed to apply a down force to the press member.

Preferably, a rear of the disk surface portion of the sucking disk body of the sucking disk member is provided with a plurality of raised blocks adjacent to the coupling edge portion. The raised blocks are arranged concentrically and penetrate the sealing rim and extend out of the upper rim portion. The press surface portion of the press member has a plurality of limit recesses therein corresponding to the raised blocks. The raised blocks are positioned in the limit recesses. When the tightening operation member is operated for the sucking disk body to form vacuum suction, the tightening operation member applies a down force to the press member and the walls of the limit recesses compress the raised blocks, preventing the suction surface portion of the sucking disk body from sliding for the sucking disk body to improve the capability of sucking the surface.

DETAILED DESCRIPTION OF THE PREFERRED EMBODIMENTS

Figure 1:
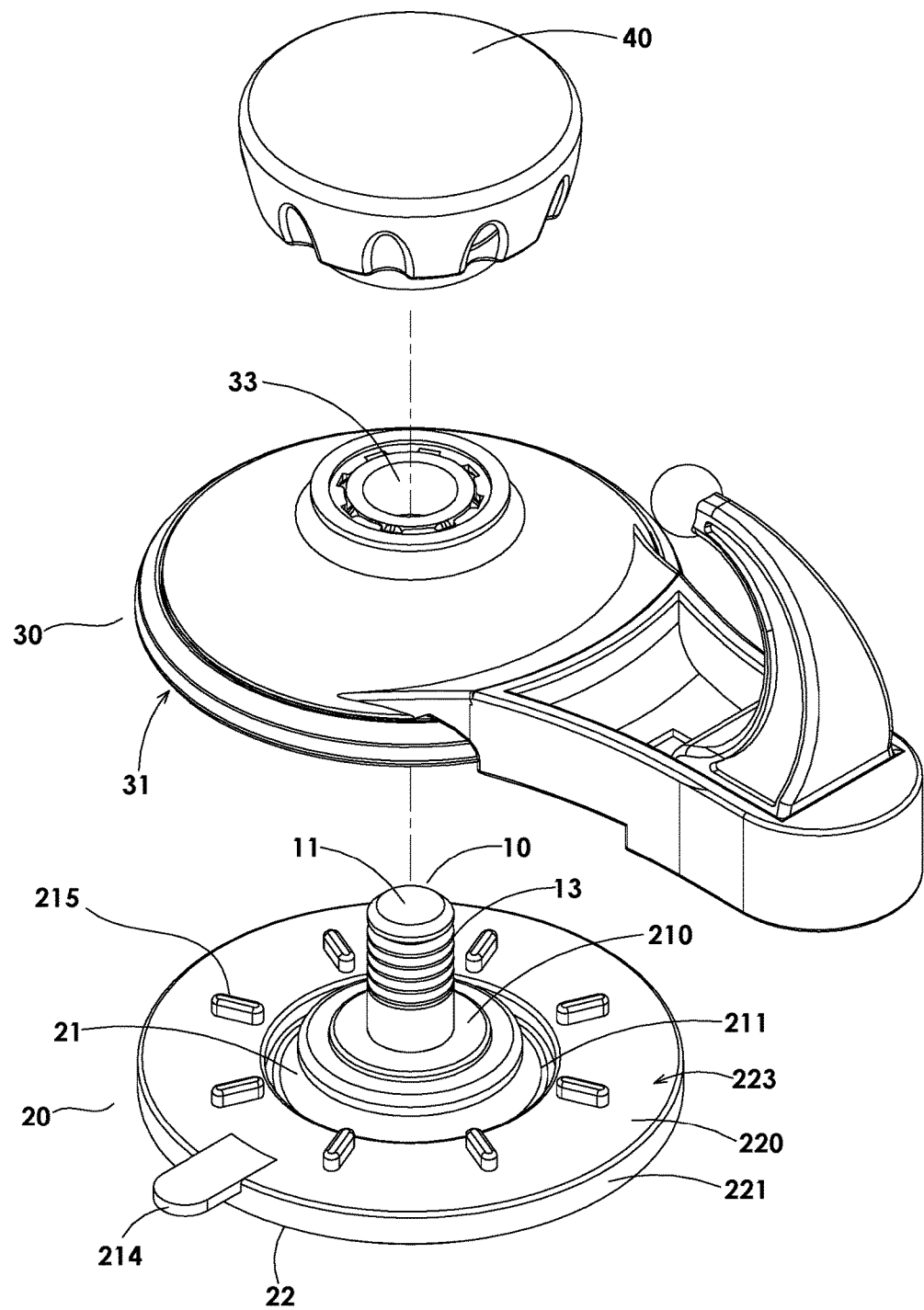
FIG. 1 is an exploded view of the present invention.
Figure 2:
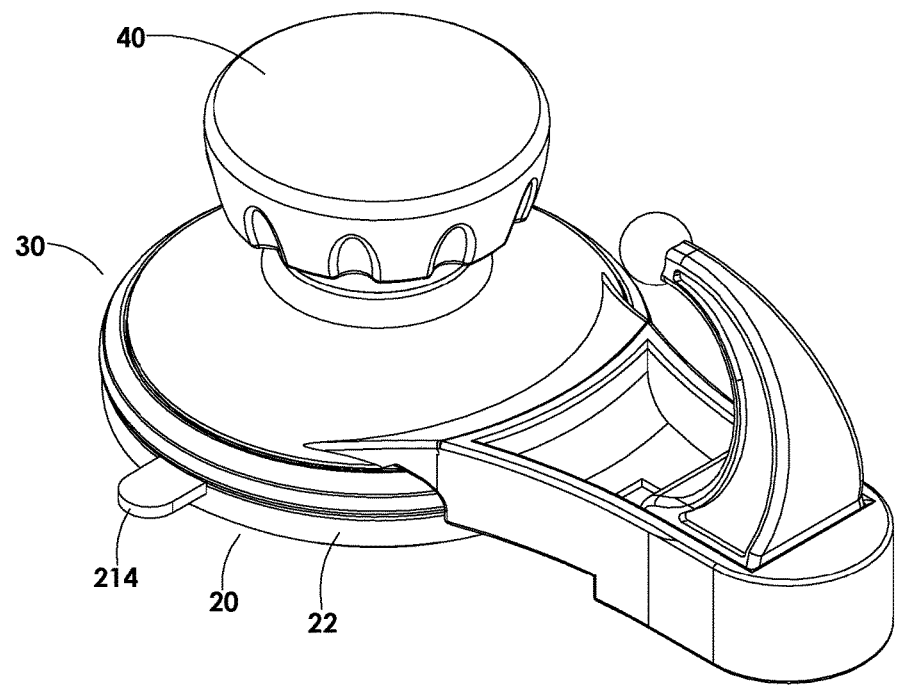
FIG. 2 is a perspective view of the present invention.

Embodiments of the present invention will now be described, by way of example only, with reference to the accompanying drawings.

As shown in FIG. 1 through FIG. 4, a vacuum retaining device capable of reuse comprises a pull member 10, a sucking disk member 20, a press member 30, and a fastening operation member 40.

The pull member 10 is made of POM (Polyoxymethylene) which is a hard rigid plastic material. The pull member 10 has a pull rod 11. One end of the pull rod 11 is formed with a pull plate 12.

The sucking disk member 20 comprises a sucking disk body 21 and a sealing rim 22. The sucking disk body 21 is made of a flexible elastic macromolecule (plastic) material and integrally formed with the pull plate 12 of the pull member 10 by injection molding when the pull member 10 is placed in a plastic mold (not shown in the drawings). The sucking disk body 21 is a soft disk-shaped elastic body, and has a covering portion 210 to cover the pull plate 12. A lower edge of the covering portion 210 is enlarged and formed with a disk surface portion 211. An outer periphery of the disk surface portion 211 is formed with a coupling edge portion 212. A bottom of the disk surface portion 211 is formed with a suction surface portion 213. The sealing rim 22 is made of a TPS (Thermoplastic Styrene Elastomer) plastic material and integrally formed with the coupling edge portion 212 of the sucking disk body 21 by overmolding in a plastic mold (not shown in the drawings). The sealing rim 22 is a soft elastic rim with high elongation rate, and has a hardness of Shore C 20-30 degrees. The sealing rim 22 has an upper rim portion 220, a side rim portion 221, and a bottom rim portion 222 to cover and connect with the coupling edge portion 212. An upper surface of the upper rim portion 220 is formed with a compression surface 223. A lower surface of the bottom rim portion 222 is formed with a sealing surface 224 located next to the suction surface portion 213 of the sucking disk body 21.

The press member 30 is a high-strength cup made of an ABS (Acrylonitrile butadiene styrene) hard resign material. A bottom of the press member 30 has a press surface portion 31 corresponding in shape and size to the compression surface 223 of the sealing rim 22 for the compression surface 223 to lean against the upper rim portion 220. The press surface portion 31 has an accommodation room 32 therein to accommodate the sucking disk body 21. The press member 30 has a through hole 33 above the accommodation room 32 for the pull rod 11 of the pull member 10 to pass therethrough. A space 34 is formed between the through hole 33 and the covering portion 210 of the sucking disk body 21.

The fastening operation member 40 leans against an upper end of the through hole 33 of the press member 30 and is connected with the pull rod 11 of the pull member 10 out of the through hole 33. The fastening operation member 40 can be operated on the press member 30 to bring the pull rod 11 to extend out of the through hole 33.

Figure 3:
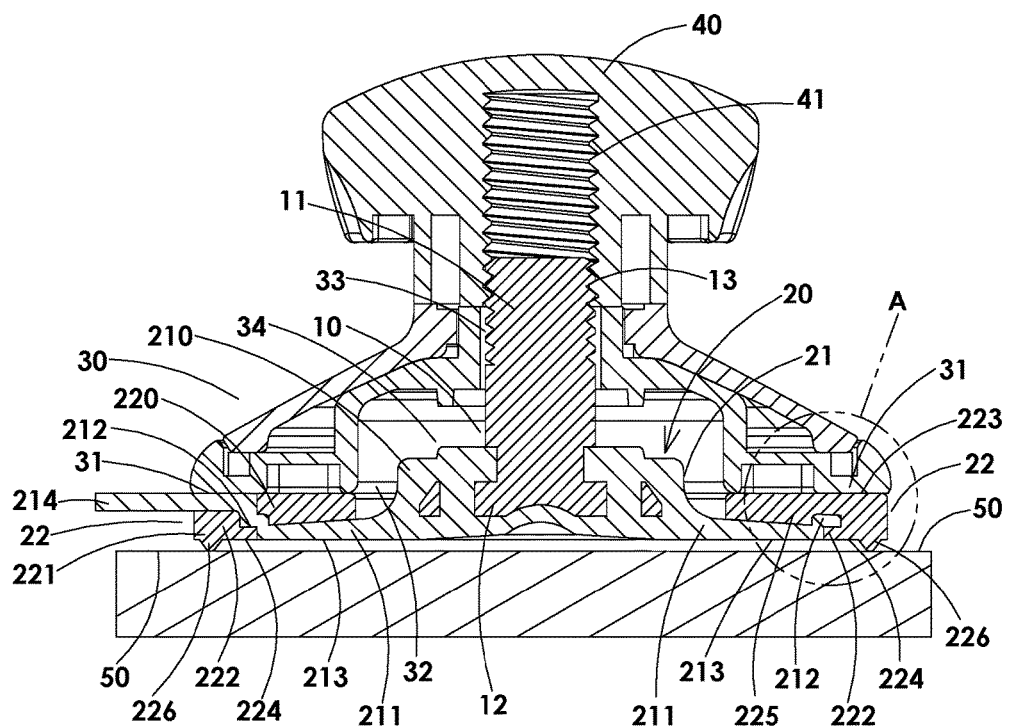
FIG. 3 is a sectional view of the present invention.
Figure 4:
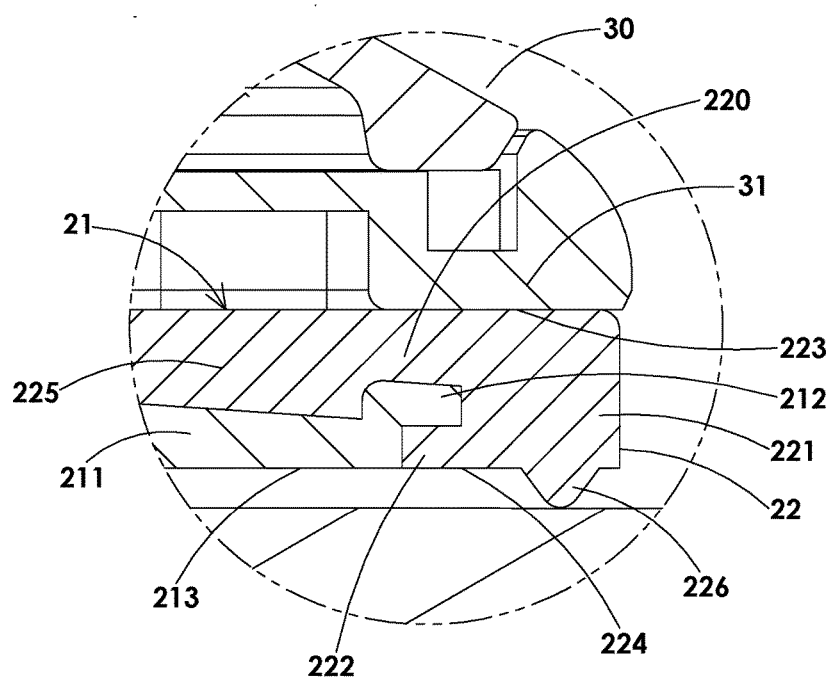
FIG. 4 is an enlarged view of circle A of FIG. 3.
Figure 5:
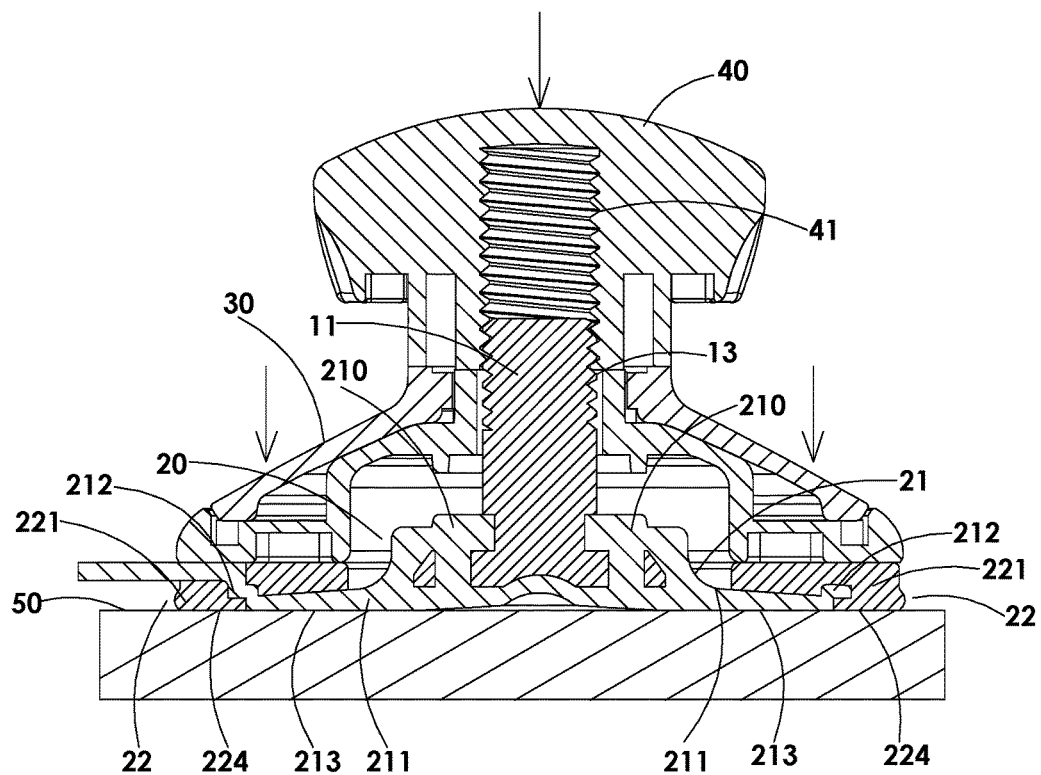
FIG. 5 is a schematic view of the present invention on a surface to be adhered before vacuum suction.
Figure 6:
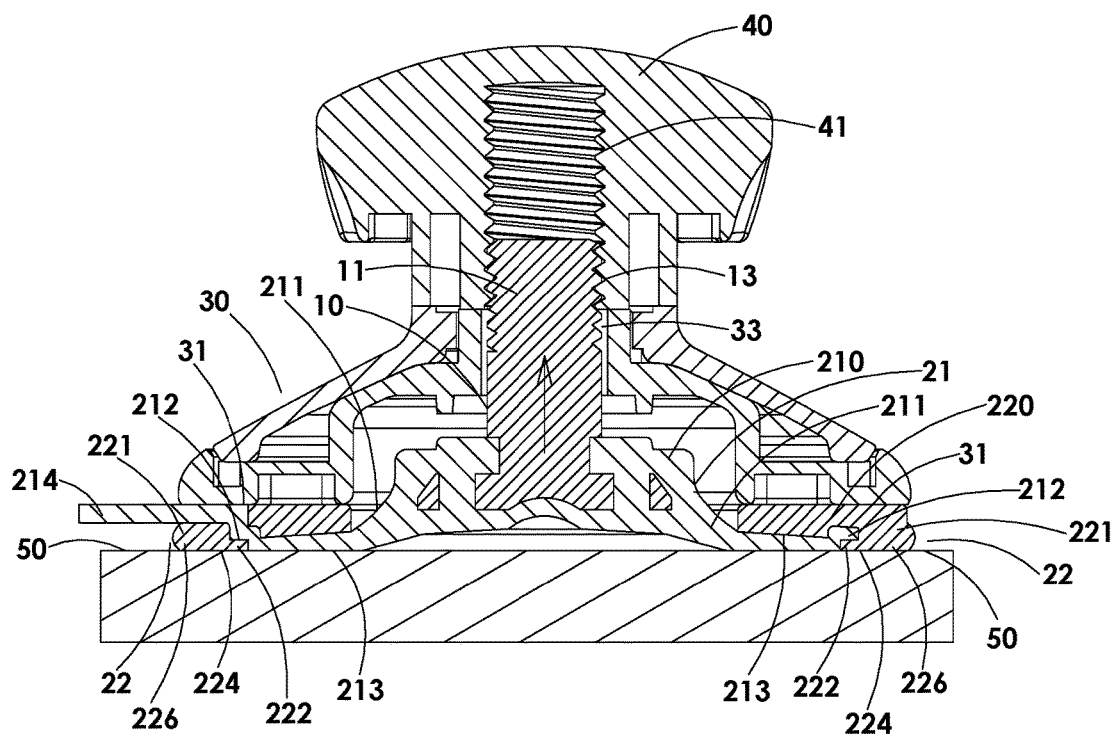
FIG. 6 is a schematic view of the present invention on the surface to be adhered after vacuum suction.

As shown in FIG. 5, when the fastening operation member 40 with the press member 30 is pressed down toward a surface 50 to be adhered, the suction surface portion 213 of the sucking disk body 21 of the sucking disk member 20 and the sealing surface 224 of the sealing rim 22 are attached to the surface 50 to block the exterior air from entering the interior of the sucking disk body 21. As shown in FIG. 6, by operating the fastening operation member 40, the pull rod 11 of the pull member 10 is moved upward toward the through hole 33. When the covering portion 210 of the sucking disk body 21 is lifted by the pull rod 11 (the pull plate 12), the disk surface portion 211 is enlarged and deformed to form a vacuum suction between the sucking disk body 21 and the surface 50. The counterforce of the elasticity of the disk surface portion 211 after enlarged and deformed applies a down force to the press member 30 through the pull rod 11 to act on the fastening operation member 40 and enables the press surface portion 31 of the press member 30 to press the upper rim portion 220 of the sealing rim 22. The sealing surface 224 is in contact with the surface 50 tightly. Even if the surface 50 has a seam or a serrate line, the seam or the serrate line can be blocked by the compressed bottom rim portion 222. Thus, the sucking disk body 21 can be retained on the surface 50 well in a vacuum suction state. As shown in FIG. 3 and FIG. 4, the periphery of the disk surface portion 211 of the sucking disk body 21 is formed with the coupling edge portion 212 to cover and connect with the sealing rim 22. As shown in FIG. 3, FIG. 5 and FIG. 6, the vacuum retaining device can be reused at different positions of the surface 50 or a different surface to be adhered. During use, the coupling edge portion 212 inside soft the sealing rim 22 is deformed as a support, such that the efficacy of the sealing rim 22 can be kept for a long time. In particular, when the sealing surface 224 of the sealing rim 22 is poked by an external force to disengage from the surface 50, the sealing surface 224 is able to link the coupling edge portion 212 of the sucking disk body 21. When the vacuum retaining device is not used, the outer edge of the side rim portion 221 of the sealing rim 22 is poked for the air to enter the interior of the sucking disk body 21 (the inner edge of the suction surface portion 213) to form a vacuum state or release the suction. The vacuum retaining device can be detached from the surface 50 easily and conveniently.

According to the aforesaid embodiment, as shown in FIG. 3 and FIG. 4, the coupling edge portion 212 at the outer periphery of the disk surface portion 211 of the sucking disk body 21 of the sucking disk member 20 has a reverse L shape. The sealing rim 22 is to cover and connect with the coupling edge portion 212. The sealing rim 22 has a buckle portion 225 to buckle a rear edge end surface of the coupling edge portion 212, such that the sealing rim 22 can cover and retain the coupling edge portion 212 of the sucking disk body 21 stably and firmly and won't disengage from the disk surface portion 211 of the sucking disk body 21.

According to the aforesaid embodiment, as shown in FIG. 1, FIG. 3 and FIG. 4, the sucking disk body 21 of the sucking disk member 20 is made of a TPE (Thermoplastic elastomer) material by injection molding. The covering portion 210, the disk surface portion 211 and the coupling edge portion 212 have a hardness of Shore A 70-90 degrees. The sealing rim 22 is integrally formed with the coupling edge portion 212 by over-molding. During forming, because the material of the sealing rim 22 is TPE, the sealing rim 22 can be bound with a portion of the disk surface portion 211 and the whole coupling edge portion 212. The sealing rim 22 covers the coupling edge portion 212 fully and is connected with the coupling edge portion 212. They won't disengage from each other.

According to the aforesaid embodiment, as shown in FIG. 3 and FIG. 4, the lower surface of the bottom rim portion 222 of the sealing rim 22 is provided with at least one protrusion 226 extending outward (downward) from the sealing surface 224. As shown in FIG. 3 and FIG. 6, through the protrusion 226, the surface 50 can be pressed more tightly by the bottom rim portion 222 to enhance the seal capability of the sealing rim 22. Through the elastic resilience of the protrusion 26 after pressed and deformed, the convenience for the sealing surface 224 to disengage from the surface 50 can be enhanced.

According to the aforesaid embodiment, the coupling edge portion 212 at the outer periphery of the disk surface portion 211 of the sucking disk body 21 of the sucking disk member 20 is provided with a pull piece 214 passing the upper rim portion 220 of the sealing rim 22 and extending outward. As shown in FIG. 3 and FIG. 6, when the pull piece 214 is pulled, a portion of the sealing surface 224 and a portion of the sucking disk body 21 are brought to disengage from the surface 50, such that the vacuum retaining device 50 can be detached from the surface 50 easily.

According to the aforesaid embodiment, as shown in FIG. 1 and FIG. 3, one end of the pull rod 11 of the pull member 11 extends out of the through hole 33 of the press member 30. The pull rod 11 has an outer threaded portion 13 disposed out of the through hole 33. The fastening operation member 40 is a knob. One end of the fastening operation member 40 is in contact with the end of the press member 30 and has an inner threaded hole 41 to mesh with the outer threaded portion 13. As shown in FIG. 3, FIG. 5 and FIG. 6, by turning the tightening operation member 4, the inner threaded hole 41 acts on the immovable outer threaded portion 13 to drive the pull rod 11 to displace toward the inner threaded hole 41. Through the pull rod 11, the covering portion 210 of the sucking disk body 21 is lifted and the disk surface portion 211 is enlarged and deformed (to form a vacuum state) to apply a down force to the press member 30 (the sealing rim 22 is pressed).

Figure 7:
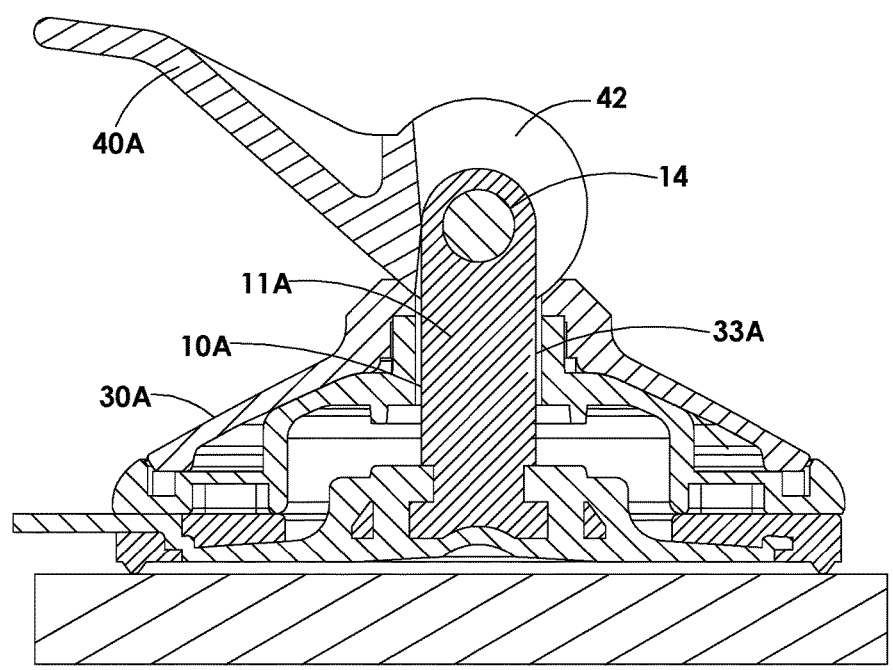
FIG. 7 is a sectional view in accordance with another embodiment of the present invention.
Figure 8:
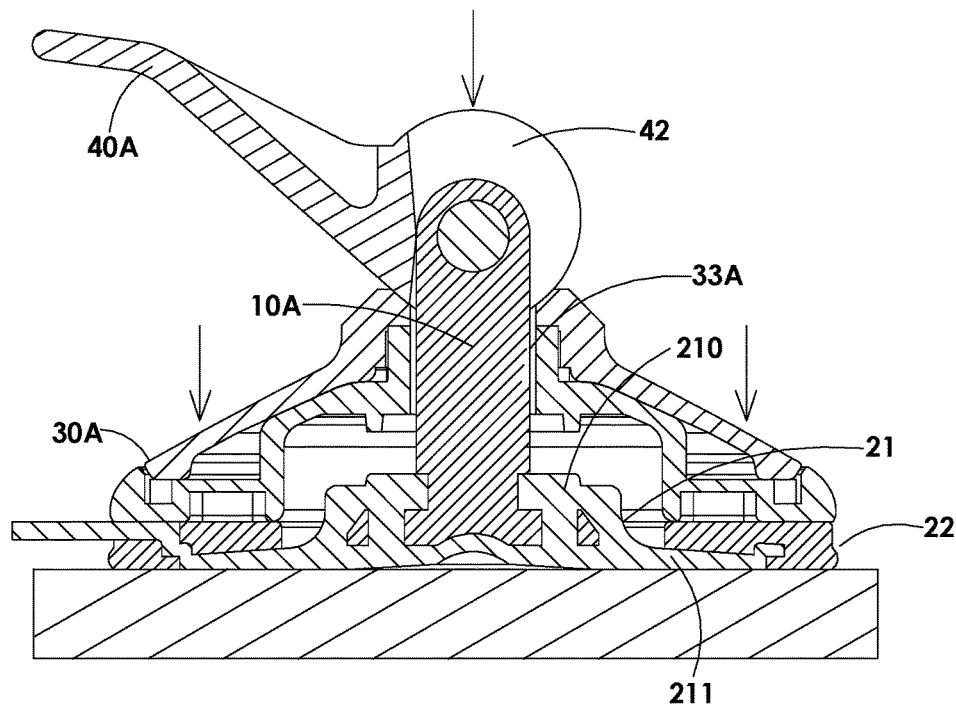
FIG. 8 is a schematic view of the embodiment of FIG. 7 before vacuum suction.
Figure 9:
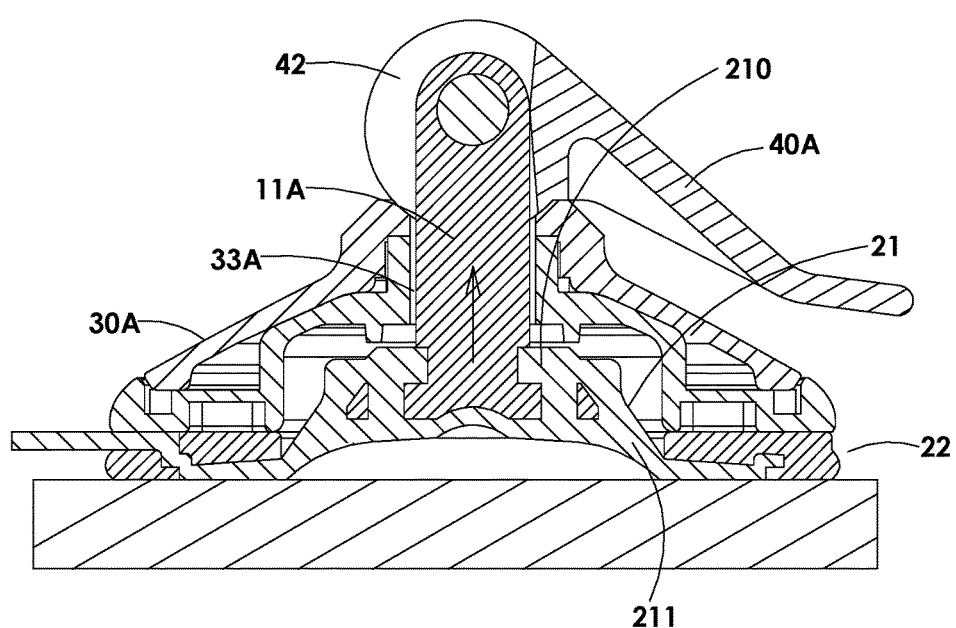
FIG. 9 is a schematic view of the embodiment of FIG. 7 after vacuum suction.

According to another embodiment, the covering portion of the sucking disk body is lifted, enabling the disk surface portion to be a vacuum state. As shown in FIG. 7, the end of the pull rod 11A of the pull member 10A, extending out of the through hole 33A of the press member 30A, has a pivot hole 14. The tightening operation member 40A is shaped like a handle and has an eccentric cam portion 42 which is pivotally connected with the pivot hole 14 and in contact with the upper end of the press member 30A. As shown in FIG. 8 and FIG. 9, the eccentric cam portion 42 is turned to actuate and bring the pull rod 11A to extend out of the through hole 33A of the press member 30A. When the tightening operation member 40A is pulled to turn, the pull rod 11A is to lift the covering portion 210 of the sucking disk body 21 and the disk surface portion 211 is enlarged and deformed (to form a vacuum state) to apply a down force to the press member 30A (the sealing rim 22 is pressed).

Figure 10:
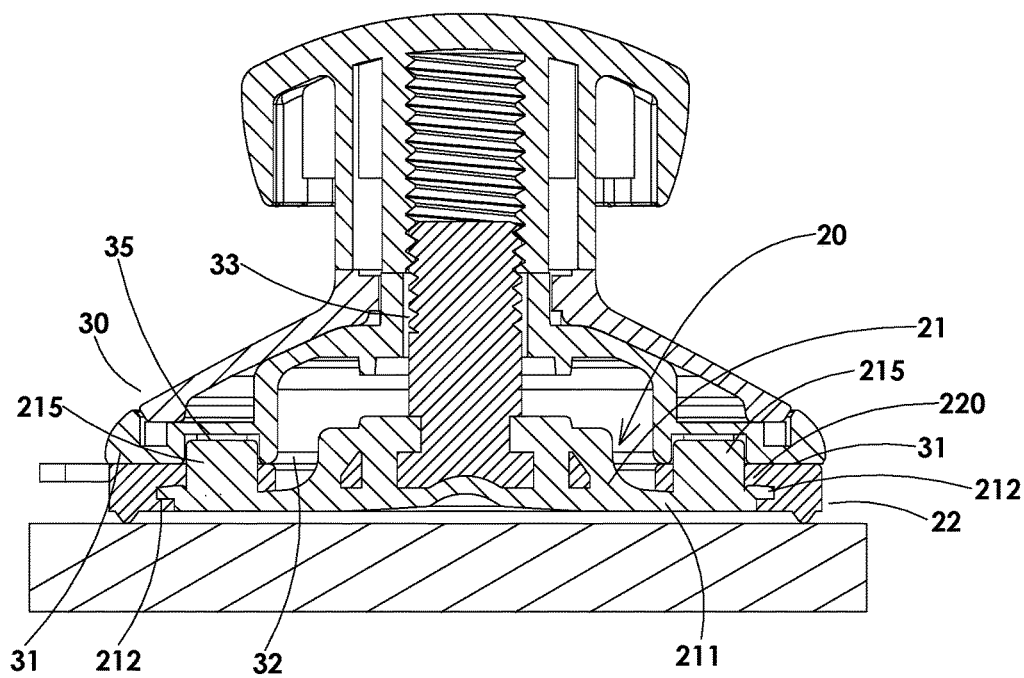
FIG. 10 is a sectional view of the anti-slide configuration of the sucking disk of the present invention.
Figure 11:
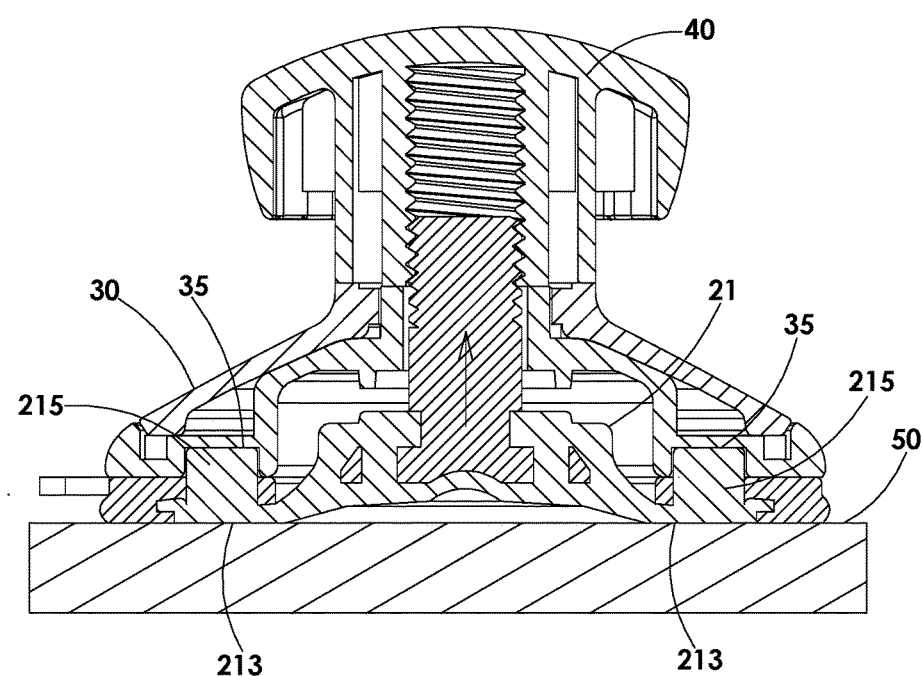
FIG. 11 is a schematic view of the anti-slide configuration of the sucking disk of the present invention.

According to the aforesaid embodiment, as shown in FIG. 1 and FIG. 10, a rear of the disk surface portion 211 of the sucking disk body 21 of the sucking disk member 20 is provided with a plurality of raised blocks 215 adjacent to the coupling edge portion 212. The raised blocks 215 are arranged concentrically and penetrate the sealing rim 22 and extend out of the upper rim portion 220. The press surface portion 31 of the press member 30 has a plurality of limit recesses 35 therein corresponding to the raised blocks 215. The raised blocks 215 are positioned in the limit recesses 35. As shown in FIG. 11, when the tightening operation member 40 is operated for the sucking disk body 21 to form vacuum suction, the tightening operation member 40 applies a down force to the press member 30 and the walls of the limit recesses 35 compress the raised blocks 215, preventing the suction surface portion 213 of the sucking disk body 21 from sliding for the sucking disk body 21 to improve the capability of sucking the surface 50.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A vacuum retaining device capable of reuse, comprising:
    a pull member made of a hard rigid plastic material, the pull member having a pull rod, one end of the pull rod being formed with a pull plate;
    a sucking disk member comprising a sucking disk body and a sealing rim; the sucking disk body being made of a flexible elastic macromolecule material and integrally formed with the pull plate of the pull member by injection molding when the pull member is placed in a plastic mold, the sucking disk body being a soft disk-shaped elastic body and having a covering portion to cover the pull plate, a lower edge of the covering portion being enlarged and formed with a disk surface portion, an outer periphery of the disk surface portion being formed with a coupling edge portion; a bottom of the disk surface portion being formed with a suction surface portion, the sealing rim being made of a TPS (Thermoplastic Styrene Elastomer) plastic material and integrally formed with the coupling edge portion of the sucking disk body by over-molding in a plastic mold, the sealing rim being a soft elastic rim with high elongation rate and having a hardness of Shore C 20-30 degrees, the sealing rim having an upper rim portion, a side rim portion, and a bottom rim portion to cover and connect with the coupling edge portion, an upper surface of the upper rim portion being formed with a compression surface, a lower surface of the bottom rim portion being formed with a sealing surface located next to the suction surface portion of the sucking disk body;
    a press member made of a hard material and having high strength, a bottom of the press member having a press surface portion corresponding to the compression surface of the sealing rim for the compression surface to lean against the upper rim portion, the press surface portion having an accommodation room therein to accommodate the sucking disk body, the press member having a through hole above the accommodation room for the pull rod of the pull member to pass therethrough, a space being formed between the through hole and the covering portion of the sucking disk body; and a fastening operation member leaning against an upper end of the press member and being connected with the pull rod of the pull member out of the through hole;

wherein the coupling edge portion at the outer periphery of the disk surface portion of the sucking disk body of the sucking disk member has an inverted L shape, the sealing rim covers and connects with the coupling edge portion, and the sealing rim has a buckle portion to buckle a rear edge end surface of the coupling edge portion such that the sealing rim covers and retains the coupling edge portion of the sucking disk body stably, and secures to the disk surface portion of the sucking disk body.

2. The vacuum retaining device capable of reuse as claimed in claim 1, wherein the sucking disk body of the sucking disk member is made of a TPE (Thermoplastic elastomer) material by injection molding, the covering portion, the disk surface portion, and the coupling edge portion have a hardness of Shore A 70-90 degrees, and the sealing rim is integrally formed with the coupling edge portion by over-molding.

3. The vacuum retaining device capable of reuse as claimed in claim 1, wherein the lower surface of the bottom rim portion of the sealing rim is provided with at least one protrusion extending outward from the sealing surface.

4. The vacuum retaining device capable of reuse as claimed in claim 1, wherein the coupling edge portion at the outer periphery of the disk surface portion of the sucking disk body of the sucking disk member is provided with a pull piece passing the upper rim portion of the sealing rim and extending outward.

5. The vacuum retaining device capable of reuse as claimed in claim 1, wherein one end of the pull rod of the pull member extends out of the through hole of the press member, the pull rod has an outer threaded portion disposed out of the through hole, the fastening operation member is a knob, and one end of the fastening operation member is in contact with the upper end of the press member and has an inner threaded hole to mesh with the outer threaded portion.

6. The vacuum retaining device capable of reuse as claimed in claim 1, wherein the end of the pull rod of the pull member, extending out of the through hole of the press member, has a pivot hole, the tightening operation member is shaped like a handle and has an eccentric cam portion, and the eccentric cam portion is pivotally connected with the pivot hole and in contact with the upper end of the press member.

7. The vacuum retaining device capable of reuse as claimed in claim 1, wherein a rear of the disk surface portion of the sucking disk body of the sucking disk member is provided with a plurality of raised blocks adjacent to the coupling edge portion, the raised blocks are arranged concentrically and penetrate the sealing rim and extend out of the upper rim portion, the press surface portion of the press member has a plurality of limit recesses therein corresponding to the raised blocks, and the raised blocks are positioned in the limit recesses.

* * * * *